US009261718B2

(12) United States Patent
Hasegawa et al.

(10) Patent No.: US 9,261,718 B2
(45) Date of Patent: Feb. 16, 2016

(54) COMPOSITE THIN FILM AND COMPOSITE NANOCRYSTALS CONTAINING EUROPIUM (II) COMPOUND AND METAL

(75) Inventors: Yasuchika Hasegawa, Sapporo (JP); Akira Kawashima, Sapporo (JP); Mina Kumagai, Sapporo (JP); Koji Fushimi, Sapporo (JP)

(73) Assignee: National University Corporation Hokkaido University, Hokkaido (JP)

( * ) Notice: Subject to any disclaimer, the term of this patent is extended or adjusted under 35 U.S.C. 154(b) by 213 days.

(21) Appl. No.: 14/002,876

(22) PCT Filed: Mar. 1, 2012

(86) PCT No.: PCT/JP2012/055263
§ 371 (c)(1),
(2), (4) Date: Nov. 18, 2013

(87) PCT Pub. No.: WO2012/121111
PCT Pub. Date: Sep. 13, 2012

(65) Prior Publication Data
US 2014/0055855 A1 Feb. 27, 2014

(30) Foreign Application Priority Data
Mar. 4, 2011 (JP) ................. 2011-047595

(51) Int. Cl.
G02F 1/09 (2006.01)
C01B 19/00 (2006.01)
(Continued)

(52) U.S. Cl.
CPC .............. *G02F 1/093* (2013.01); *C01B 19/007* (2013.01); *C01F 17/0043* (2013.01);
(Continued)

(58) Field of Classification Search
CPC ......... G02F 1/093; G02F 1/09; C01B 19/007; C01F 17/0043; C01F 17/0087; G11B 11/10586; C25D 7/00; H01F 1/0036; C01P 2004/64; C01P 2002/72; C01P 2002/84; C01P 2004/04; C01P 2004/38; B82Y 99/00; B82Y 30/00
USPC ............... 359/324, 484.03; 428/32.74, 846.2; 977/778, 779, 810, 834, 900
See application file for complete search history.

(56) References Cited

U.S. PATENT DOCUMENTS 7,713,908 B2 * 5/2010 Yamamoto et al. ........... 502/300
2008/0072705 A1 * 3/2008 Chaumonnot et al. .......... 75/338
(Continued)

FOREIGN PATENT DOCUMENTS

JP         6-325935 A      11/1994
JP       2001-354417 A    12/2001
(Continued)

OTHER PUBLICATIONS

International Search Report with a mailing date of Apr. 3, 2012 for counterpart International Application No. PCT/JP2012/055263.
(Continued)

*Primary Examiner* — Frank Font
(74) *Attorney, Agent, or Firm* — Sughrue Mion, PLLC

(57) ABSTRACT

The present invention is produced by a composite with an Eu (II) compound nanoparticle and a metal nanoparticle. Such production generates quantum size effects of the Eu (II) compound nanoparticle, while the surface plasmon of the metal nanoparticle can be used. Thus, the magnetooptical property can be improved. In addition, a thin film may be produced by a composite with an Eu (II) compound nanoparticle and a metal nanoparticle.

20 Claims, 20 Drawing Sheets

(51) Int. Cl.
*C01F 17/00* (2006.01)
*G11B 11/105* (2006.01)
*C25D 7/00* (2006.01)
*H01F 1/00* (2006.01)
*G02F 1/00* (2006.01)
*B82Y 99/00* (2011.01)
*B82Y 30/00* (2011.01)

(52) U.S. Cl.
CPC ............ *C01F 17/0087* (2013.01); *C25D 7/00* (2013.01); *G02F 1/0036* (2013.01); *G02F 1/09* (2013.01); *G11B 11/10586* (2013.01); *H01F 1/0036* (2013.01); *B82Y 30/00* (2013.01); *B82Y 99/00* (2013.01); *C01P 2002/72* (2013.01); *C01P 2002/84* (2013.01); *C01P 2004/04* (2013.01); *C01P 2004/38* (2013.01); *C01P 2004/64* (2013.01)

(56) References Cited

U.S. PATENT DOCUMENTS

2009/0227044 A1* 9/2009 Dosev et al. .................. 436/526
2010/0239794 A1* 9/2010 Andrews et al. ........... 428/32.72

FOREIGN PATENT DOCUMENTS

| | | |
|---|---|---|
| JP | 2004-354927 A | 12/2004 |
| JP | 2008-268862 A | 11/2008 |
| JP | 2011-86572 A | 4/2011 |
| WO | 2007/102271 A1 | 9/2007 |

OTHER PUBLICATIONS

English translation of the International Preliminary Report on Patentability and Written Opinion of the International Searching Authority mailed Sep. 6, 2013 for counterpart International Application No. PCT/JP2012/055263.

Hiroki Nakao et al.; "EuS-Au Fukugo Nano Ryushi no Gosei Oyobi Hikari Jiki Tokusei no Hyoka"; CSJ: The Chemical Society of Japan Koen Yokoshu; vol. 90th; No. 3; Mar. 12, 2010; p. 921, 2PC-012.

* cited by examiner

COMPOSITE THIN FILM AND COMPOSITE NANOCRYSTALS CONTAINING EUROPIUM (II) COMPOUND AND METAL

CROSS REFERENCE TO RELATED APPLICATIONS

This application is a National Stage of International Application No. PCT/JP2012/055263 filed Mar. 1, 2012, claiming priority based on Japanese Patent Application No. 2011-047595 filed Mar. 4, 2011, the contents of all of which are incorporated herein by reference in their entirety.

TECHNICAL FIELD

Various aspects and embodiments of the present invention relate to composite nanocrystals and a composite thin film containing an Eu (II) compound and a metal.

BACKGROUND ART

Conventionally, high-speed communication with large capacity has been achieved by attaching a micro-optical isolator to a semiconductor laser. As a material for the micro-optical isolator corresponding to optical communication wavebands (1.3 µm, 1.55 µm), a Bi-substituted garnet is known (for example, see Patent Document 1). In Patent Document 1, composite film is produced by containing nanoparticles of Au, Al, Ag or the like within Bi-substituted garnet thin film, thus electric polarization induced by the metal nanoparticles is increased by surface plasmon resonance of the metal nanoparticles, and thereby magnetooptic effects of the Bi-substituted garnet are increased.

Meanwhile, in relation to the Eu (II) compound (Europium chalcogenide) represented by EuO, since Eu (II) having 7 unpaired f electrons shows intense light absorption and light emission resulting from f-d transition as well as ferromagnetic property, the compound has received attention for its magnetooptical property and is expected to be available as an optical isolator material. Among the properties, particularly the Faraday effect that a polarization plane is rotated by applying a magnetic field has been the focus of attention (for example, see Patent Documents 2 and 3). Patent Documents 2 and 3 suggest that nanocrystals of EuO express magnetooptical properties by quantum size effects at room temperature.

CITATION LIST

Patent Literature

Patent Document 1: Japanese Patent Application Laid-Open No. 2008-268862
Patent Document 2: Japanese Patent Application Laid-Open No. 2001-354417
Patent Document 3: Japanese Patent Application Laid-Open No. 2004-354927

SUMMARY OF INVENTION

Technical Problem

Development of a novel material having a magnetooptical property better than ever before is important for downsizing of optical isolators. An object of the present invention is to provide a material having an improved magnetooptical property.

Solution to Problem

As a result of diligent studies for solving the problems, the aforementioned inventors found that the Faraday effect of the Eu (II) compound is considerably increased by arranging the Eu (II) compound close to a metal which generates a localized electric field on its surface by light irradiation.

That is, the composite nanocrystal related to one aspect of the present invention is produced by a composite with an Eu (II) compound nanoparticle and a metal nanoparticle. Such production generates quantum size effects of the Eu (II) compound nanoparticle, while the surface plasmon of the metal nanoparticle can be used. Thus, the magnetooptical property can be improved.

In one embodiment, the Eu (II) compound nanoparticle may be made of a material selected from EuO, EuS, EuSe or EuTe. In addition, the metal nanoparticle may be made of a metal material selected from Ag, Au, Pt and Cu, a combination of the metal materials, or an alloy of two or more selected from Ag, Au, Pt and Cu. In addition, the crystalline Eu (II) compound nanoparticle is combined with the crystalline metal nanoparticle through a compound having the same or different two or more of a thiol group, a hydroxyl group, a carboxyl group, a sulfonic group, a cyano group, an amino group or a pyridyl group.

In addition, a composite thin film related to another aspect of the present invention is produced by the composite with the Eu (II) compound nanoparticle and the metal nanoparticle. The thus constituted composite thin film generates the same actions and effects as the aforementioned composite nanocrystal.

In addition, a magnetooptical material related to another aspect of the present invention is produced by using the composite nanocrystal or the composite thin film. Since the Eu (II) compound nanoparticle has a feature of change in magnetic susceptibility by light irradiation, for example, adoption of the composite nanocrystal or the composite thin film for a Faraday rotator allows for provision of an optical device impractical in conventional technologies like an optical isolator in which a polarization plane can be rotated corresponding to light.

In addition, an inorganic glass or polymeric thin film related to another aspect of the present invention is produced by using the composite nanocrystal or the composite thin film. Thereby, a magnetooptical material such as a novel optical isolator and a recording medium can be provided.

In addition, an optical isolator related to another aspect of the present invention is equipped with a Faraday rotator produced by using the composite nanocrystal, the composite thin film, the magnetooptical material or the inorganic glass thin film. Such a constitution can give the same polarization rotation effect as an optical isolator equipped with a Faraday rotator made of garnet crystal.

In addition, a manufacturing method of composite nanocrystal related to another aspect of the present invention comprises a step of synthesizing a crystalline Eu (II) compound nanoparticle by thermal reduction of a complex containing Eu (III), a step of synthesizing a crystalline metal nanoparticle by thermal reduction of a complex containing a metal, and a step of synthesizing a composite nanocrystal by combining the Eu (II) compound nanoparticle with the metal nanoparticle through a compound having the same or different two or more of a thiol group, a hydroxyl group, a carboxyl group, a sulfonic group, a cyano group, an amino group or a pyridyl group.

According to the aforementioned manufacturing method of the composite nanocrystal, after the crystalline Eu (II)

compound nanoparticle and the crystalline metal particle are individually made, they are combined through the compound having the same or different two or more of a thiol group, a hydroxyl group, a carboxyl group, a sulfonic group, a cyano group, an amino group or a pyridyl group, thereby the composite nanocrystals can be synthesized.

In addition, a manufacturing method of composite nanocrystal related to another aspect of the present invention comprises a step of mixing a complex containing Eu (III) with a complex containing a metal, and a step of synthesizing a composite nanocrystal by thermal reduction of the mixed complex.

According to the aforementioned manufacturing method of the composite nanocrystal, the composite nanocrystal can be synthesized by mixing the complex containing Eu (III) with the complex containing a metal concomitantly with thermal reduction.

In addition, a manufacturing method of a composite thin film related to another aspect of the present invention is a manufacturing method for electrochemically manufacturing the composite thin film, and comprises a step of dispersing the complex containing Eu (III) and the complex containing a metal in a solvent, and a step of applying a voltage by inserting a transparent electrode as a work electrode into the solvent to produce the composite thin film composed of the Eu compound nanoparticle and the metal nanoparticle on the transparent electrode.

According to the aforementioned manufacturing method of the composite thin film, the composite thin film can be produced by electrochemical actions.

In addition, a manufacturing method of a composite thin film related to another aspect of the present invention is a manufacturing method for electrochemically manufacturing the composite thin film, and comprises an Eu-dispersing step of dispersing the complex containing Eu (III) in a solvent, a metal-dispersing step of dispersing the complex containing a metal in the solvent, and a thin film-producing step of applying a voltage by inserting a transparent electrode as a work electrode into the solvent to produce the thin film composed of the Eu (II) compound or the metal on the transparent electrode, wherein the Eu-dispersing step, the thin film-producing step, the metal-dispersing step and the thin film-producing step are carried out in turn, alternatively the metal-dispersing step, the thin film-producing step, the Eu-dispersing step and the thin film-producing step are carried out in turn.

According to the aforementioned manufacturing method of the composite thin film, a layer structure composed of Eu (II) compound thin film and the metal thin film can be produced.

Advantageous Effects of Invention

Faraday effects of the Eu (II) compound can be considerably increased by arranging the Eu (II) compound close to a metal which generates a localized electric field on its surface by light irradiation.

DESCRIPTION OF EMBODIMENTS

Figure 1:
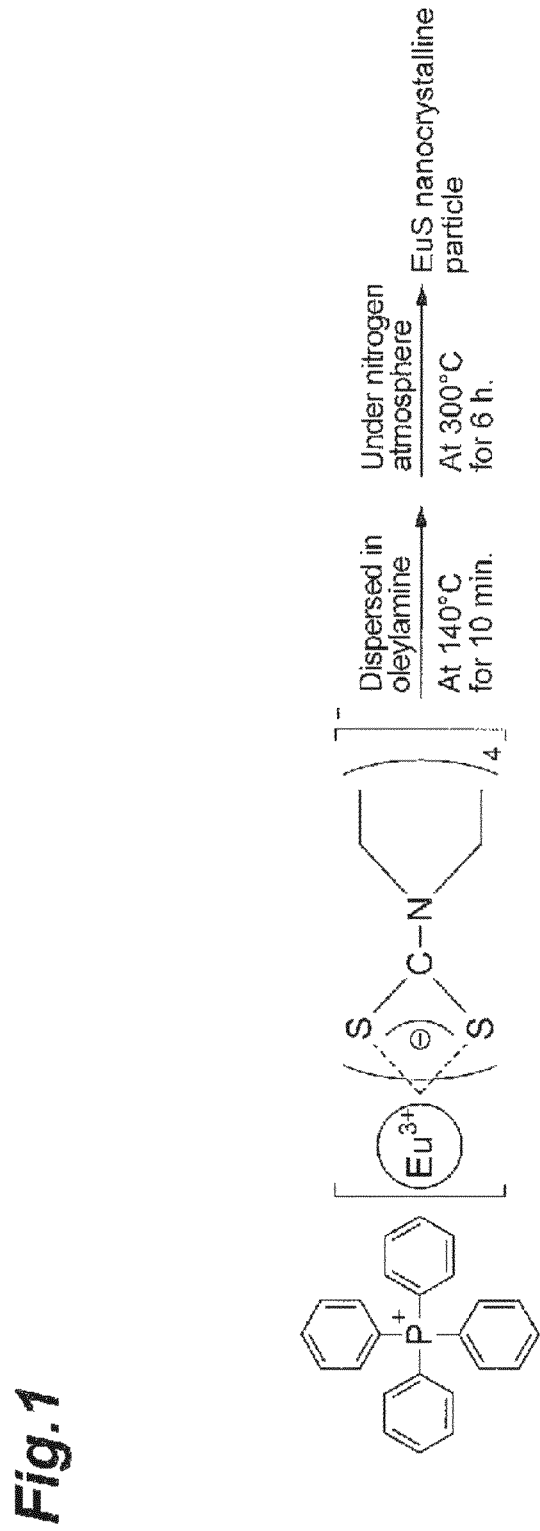
FIG. 1 represents a schematic view illustrating a manufacturing step of the EuS nanocrystalline particle.

Hereinafter, embodiments of the present invention will be explained with reference to accompanying drawings. In the description of the drawings, the same members have the same number symbols, and redundant explanations are eliminated. In addition, magnifications in the Figures do not necessarily coincide with those in the description.

(Composite Nanocrystal)

The composite nanocrystal related to the embodiment of the present invention is a composite nanocrystal being a composite with a crystalline Eu (II) compound nanoparticle and a crystalline metal nanoparticle. Here, the composite nanocrystal means a nanosized composite crystal. An average particle size of the Eu (II) compound nanoparticle is, for example, about 5 nm to 100 nm. As a material of the Eu (II) compound nanoparticle, an europium chalcogenide of, for example, EuO, EuS, EuSe or EuTe is used. An average particle size of the metal nanoparticle is, for example, about 5 nm to 100 nm. A material of the metal nanoparticle may be any metal material which generates a localized electric field on its surface by light irradiation, and for example, Ag, Au, Pt, Cu or their combination is used. Alternatively, an alloy of two or more selected from Ag, Au, Pt and Cu may be used.

The composite nanocrystal is constituted so that interfaces of the crystalline Eu (II) compound nanoparticle and the crystalline metal nanoparticle are joined. In addition, any means for joining the interfaces may be employed, for example, the Eu (II) compound nanoparticle and the metal nanoparticle may be simultaneously crystallized and synthesized, and thereby joined so that each particle adhered to each other, alternatively the crystalline Eu (II) compound nanoparticle and the crystalline metal nanoparticle may be separately produced and joined through a joint material. As the joint material, a compound having the same or different two or more of a thiol group, a hydroxyl group, a carboxyl group, a sulfonic group, a cyano group, an amino group or a pyridyl group is used. As a compound having two or more thiol groups, for example, ethanedithiol, 1,3-propanedithiol, 1,4-butanedithiol, 1,2-butanedithiol, 2,3-butanedithiol, 1,5-pentanedithiol, 1,6-hexanedithiol, 1,8-octanedithiol, 1,9-nonanedithiol, 1,10-decanedithiol, 3,6-dioxaoctane-1,8-dithiol, 2,2-oxydiethanethiol, 2,3-dimercapto-1-propanol, dithioerythritol, dithiothreitol, 1,4-benzenedithiol, 1,3-benzenedithiol, 1,2-benzenedithiol, 4-chloro-1,3-benzenedithiol, 4-methyl-1,2-benzenedithiol, 4,5-dimethyl-1,2-benzenedimethanethiol, 2,3-quinoxylenedithiol, 2-mercaptoethylsulfide, 2-dimethylamino-1,3,5-triazine-4,6-dithiol, 2-methoxy-1,3,5-triazine-4,6-dithiol, 2-dibuthylamino-1,3,5-triazine-4,6-dithiol, 2-N-phenylamino-1,3,5-triazine-4,6-dithiol, thiocyanuric acid, bismuthiol or the like is used. As a compound having a thiol group and a hydroxyl group, for example, 1-mercaptoethanol, 2-mercaptoethanol, 1-mercapto-1,1-methanediol, 1-mercapto-1,1-ethanediol, 3-mercapto-1,2-propanediol (thioglycerin), 2-mercapto-1,2-propanediol, 2-mercapto-2-methyl-1,3-propanediol, 2-mercapto-2-ethyl-1,3-propanediol, 1-mercapto-2,2-propanediol, 2-mere aptoethyl-2-methyl-1,3-propanediol, 2-methylcaptoethyl-2-ethyl-1,3-propanediol or the like is used. As a compound having a thiol group and a carboxyl group, for example, thioglycolic acid, thiomalic acid, thiosalicyclic acid, mercaptopropionic acid or the like is used. As a compound having a thiol group and a sulfonic group, for example, 2-mercaptoethanesulfonic acid, 3-mercaptopropanesulfonic acid, 2-mercaptobenzenesulfonic acid, 3-mercaptobenzenesulfonic acid, 4-mercaptobenzenesulfonic acid or the like is used. As a compound having a thiol group and a cyano group, for example, 2-cyanobenzenethiol or the like is used. As a compound having a thiol group and an amino group, for example, aminothiophenol, aminotriazolethiol or the like is used. As a compound having a thiol group and a pyridyl group, for example, pyridinethiol or the like is used.

When the composite nanocrystal is irradiated with light, plasmon is generated on the surface of the metal particle to cause the electric field enhancing effect. This electric field enhancement affects magnetooptical properties of the Eu (II) compound nanoparticle combined with the metal particle. As a result, the magnetooptic effects of the Eu (II) compound nanoparticle itself can be increased. In addition, the Eu (II) compound is used as a nanoparticle, thereby the Faraday effect can be shown across a wide region from ultraviolet to infrared regions at room temperature due to the quantum size effect. Thus, the compound can be used as an optical element or the like corresponding to a wide range of wavelengths.

(Manufacturing Method 1 of the Composite Nanocrystal)

The first manufacturing method of the composite nanocrystal related to the embodiment will be explained. Hereinafter, a case where EuS (europium sulfide) is used as an Eu (II) compound and Au (gold) is used as a metal will be explained from the viewpoint of easiness of understanding of the explanation.

First, an Eu (III) carbamide complex as a synthetic raw material of the EuS nanocrystal: [Eu(PPh$_4$)(S$_2$CNEt$_2$)] and an Au complex as a synthetic raw material of the Au nanocrystal: [Au(PPh$_3$)Cl] are prepared.

Next, the Eu (III) carbamide complex and the Au complex are dispersed in a solvent. As the solvent, for example, oleylamine is used. An amount of oleylamine is, for example, about 4.5 g. Subsequently, the resulting solution is heated under a nitrogen atmosphere. As a heat condition, heating is conducted, for example, at 140° C. for 5 minutes. Thereby a black solution can be obtained. Subsequently, it is further heated at a high temperature under a nitrogen atmosphere. As a heat condition, heating is conducted, for example, at 180° C. for 10 minutes. Thereby, an aubergine solution can be obtained. Subsequently, the resulting solution is centrifuged. As a condition, centrifugation is conducted, for example, at 7000 rpm, at room temperature for 5 minutes, and oleylamine is used as a solvent. Thereby, an aggregate can be obtained. Subsequently, the resulting aggregate is further centrifuged. As a condition, centrifugation is conducted, for example, at 7000 rpm, at room temperature for 5 minutes, and chloroform is used as a solvent. Thereby, an EuS/Au composite nanocrystal can be obtained.

(Manufacturing Method 2 of the Composite Nanocrystal)

The second manufacturing method of the composite nanocrystal related to the embodiment will be explained with reference to FIG. 1-6. Similar to the first manufacturing method, a case where EuS is used as an Eu (II) compound and Au is used as a metal will be explained.

Similar to the first manufacturing method, first, an Eu (III) carbamide complex as a synthetic raw material of the EuS nanocrystal: [Eu(PPE$_4$)(S$_2$CNEt$_2$)] and an Au complex as a synthetic raw material of the Au nanocrystal: [Au(PPh$_3$)Cl] are prepared.

Figure 2:
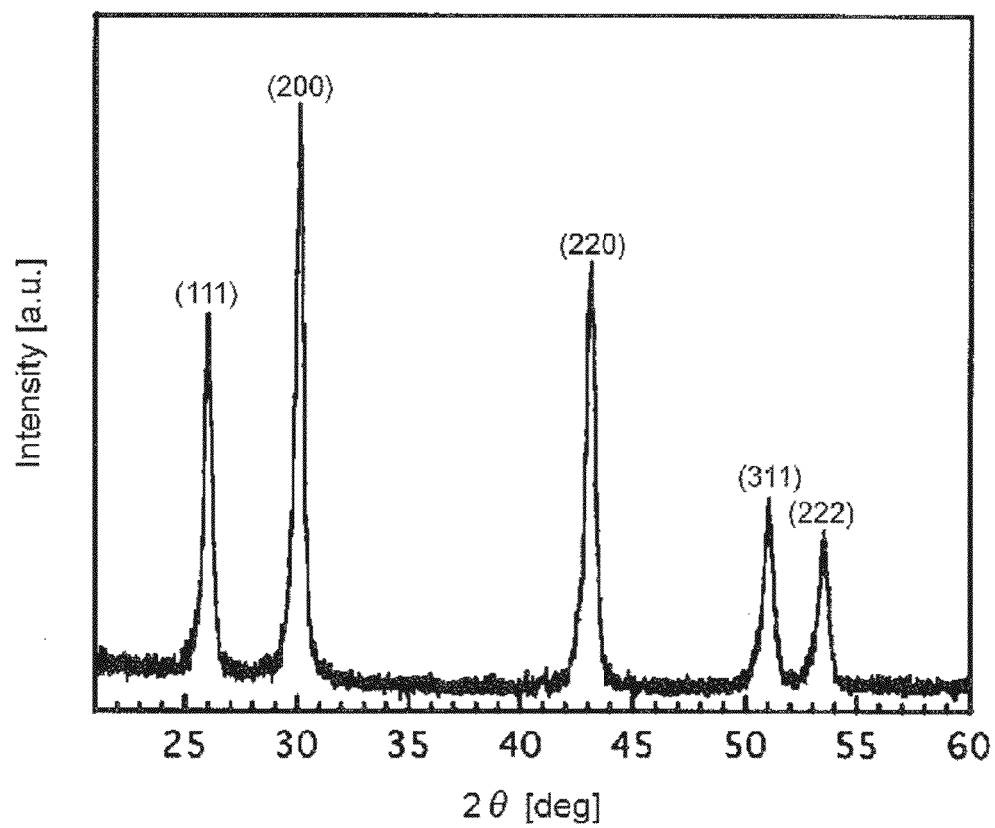
FIG. 2 represents an MD pattern of the EuS nanocrystalline particle.
Figure 3:
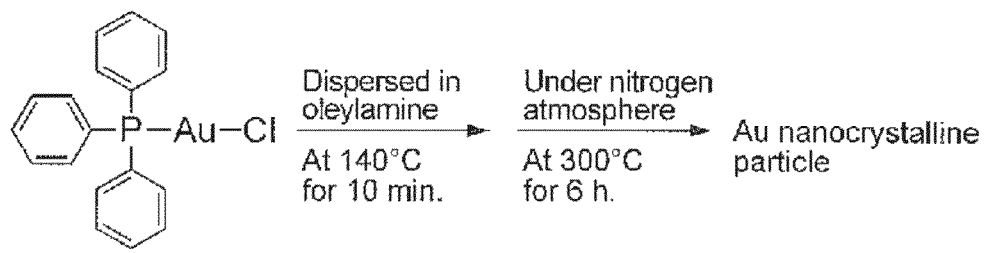
FIG. 3 represents a schematic view illustrating a manufacturing step of the Au nanocrystalline particle.

Next, the EuS nanocrystalline particle and the Au nanocrystalline particle are individually synthesized. As shown in FIG. 1, a solution in which an Eu (III) carbamide complex is dispersed in a solvent is prepared and heated. As the solvent, for example, oleylamine is used. As a heat condition, heating is conducted, for example, at 140° C. for 10 minutes. Subsequently, the resulting solution is heated under a nitrogen atmosphere. As a heat condition, heating is conducted, for example, at 300° C. for 6 hours. Thus, the EuS nanocrystalline particle can be obtained by thermal reduction. Structural evaluation of the EuS nanocrystalline particle obtained in the aforementioned process is shown in FIG. 2. FIG. 2 represents an XRD (X-ray diffraction) pattern of EuS. As shown in FIG. 2, five peaks of Eus (111), (200), (220), (311) and (222) were confirmed. In addition, the EuS nanocrystalline particle may be produced by, for example, a method using a reduction reaction of Eu (III) through light described in Japanese Patent Application Laid-Open No. 2001-354417. For example, the EuO crystal or the EuS crystal is generated by dissolving, for example, europium nitrate and urea in methanol and irradiating this with ultraviolet light. In addition, as shown in FIG. 3, a solution in which an Au complex is dispersed in a solvent is prepared and heated. For example, oleylamine is used as the solvent. As a heat condition, heating is conducted, for example, at 140° C. for 10 minutes. Subsequently, the resulting solution is heated under a nitrogen atmosphere. As a heat condition, heating is conducted, for example, at 300° C. for 6 hours. Thus, the Au nanocrystalline particle can be obtained by thermal reduction.

Figure 4:
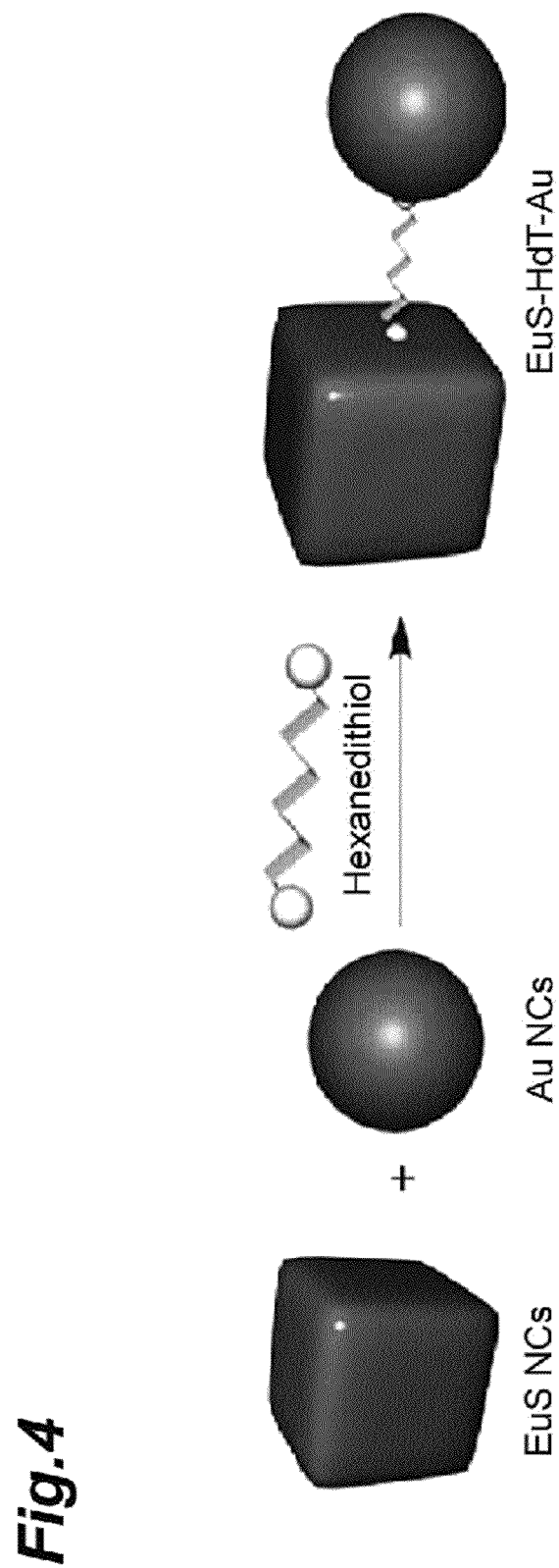
FIG. 4 represents a schematic view illustrating the EuS—Au composite nanocrystalline particle.

Next, as shown in FIG. 4, the EuS nanocrystalline particle is combined with the Au nanocrystalline particle. As a joint material, for example 1,6-hexanedithiol is used. Thereby, the EuS nanocrystalline particle is combined with the Au nanocrystalline particle, resulting in an EuS—Au composite nanocrystalline particle.

Figure 5:
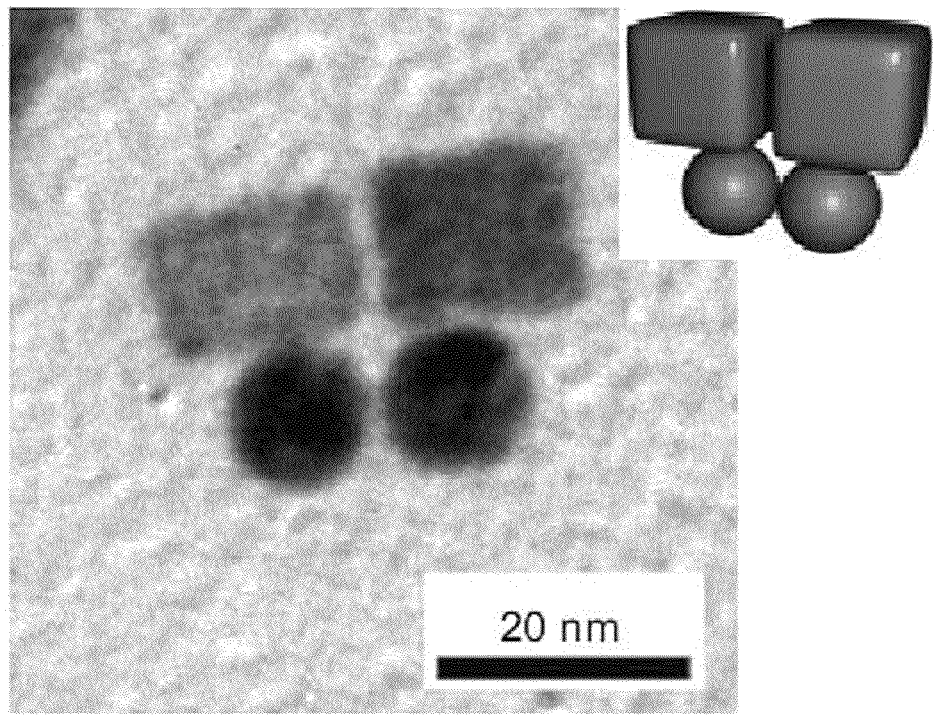
FIG. 5 represents a TEM image of the EuS—Au composite nanocrystal.
Figure 6:
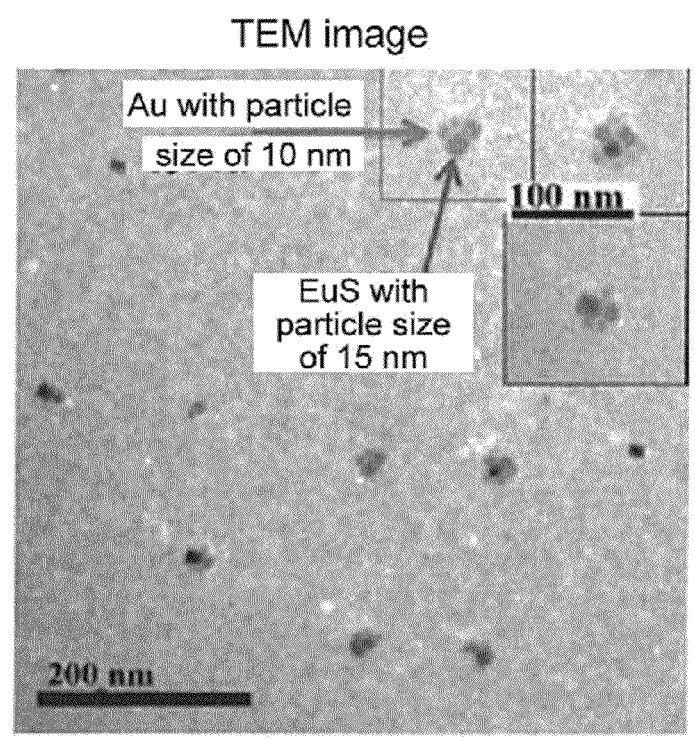
FIG. 6 represents a TEM image of the EuS—Au composite nanocrystal.
Figure 7:
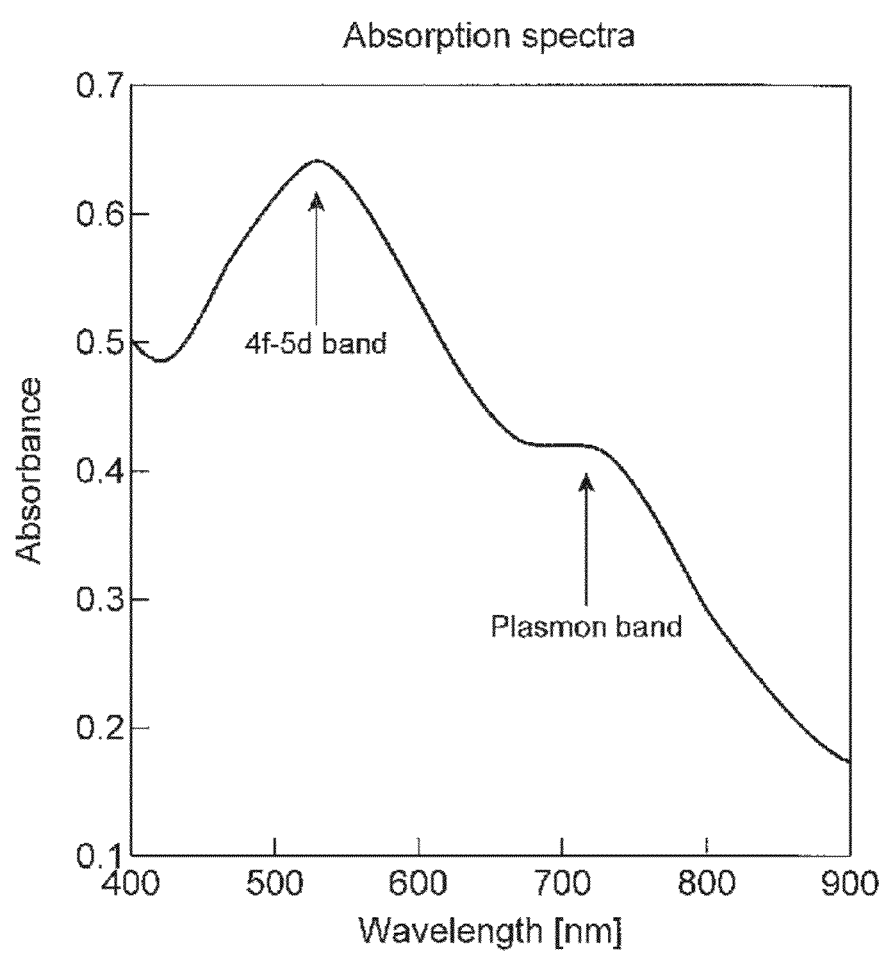
FIG. 7 represents an absorption spectrum of the EuS—Au composite nanocrystal.
Figure 8:
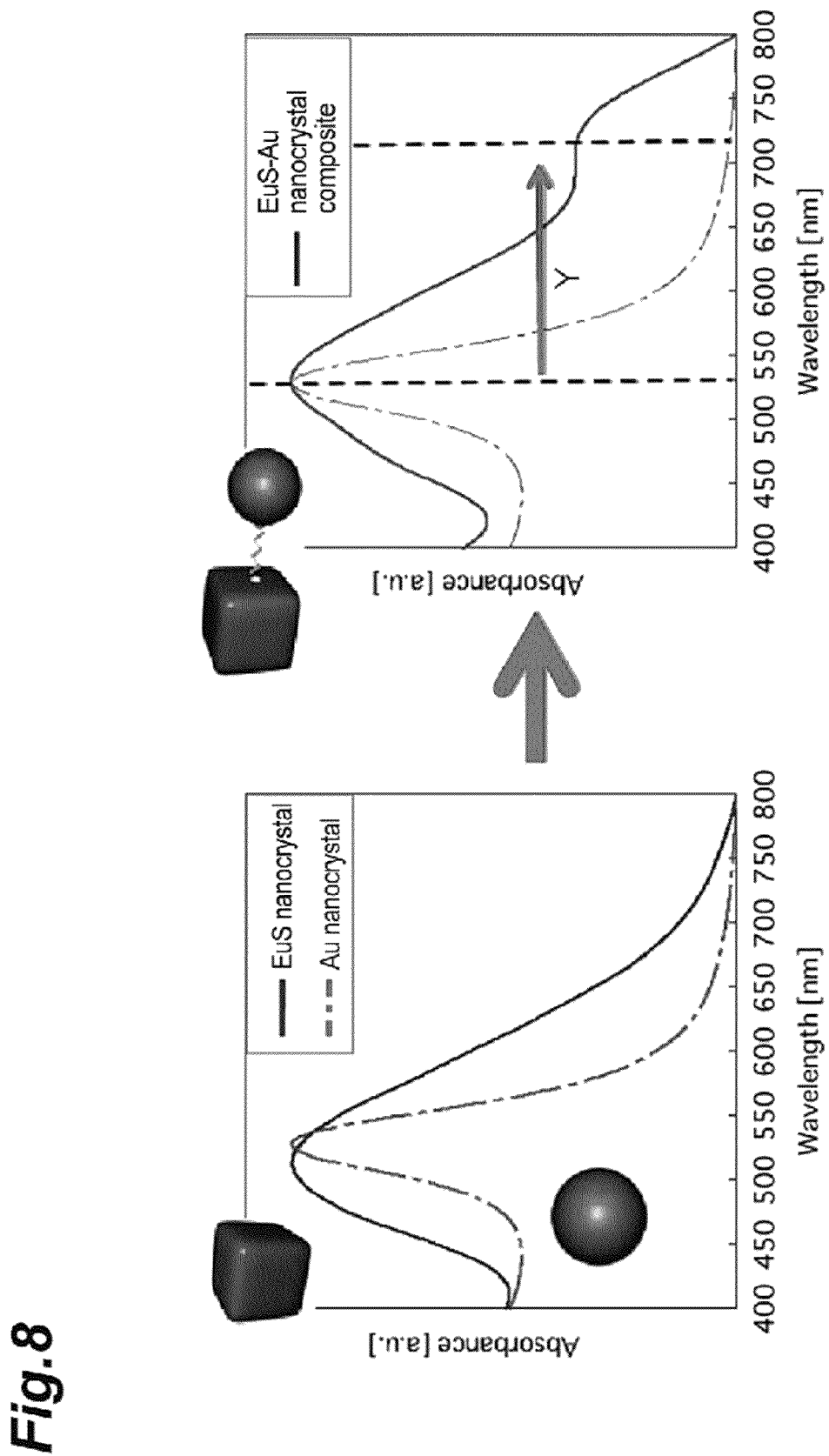
FIG. 8 (A) represents an absorption spectrum of the EuS nanocrystal, and (B) represents an absorption spectrum of the EuS—Au composite nanocrystal.

Structural evaluation of the EuS—Au composite nanocrystalline particle obtained in the aforementioned process is shown below. The structure was evaluated by TEM and absorption spectrum measurement. FIGS. 5 and 6 are TEM images. As shown in FIGS. 5 and 6, Au having a particle size of about 10 nm was confirmed to be combined with EuS having a particle size of about 15 nm. FIG. 7 represents an absorption spectrum at a wavelength ranging 400 nm to 900 nm. As shown in FIG. 7, a $4f$-$5d$ band and a plasmon absorption band of the EuS—Au composite nanocrystalline particle was confirmed. In addition, (A) in FIG. 8 represents absorption spectra of the EuS nanocrystal and Au nanocrystal, and (B) in FIG. 8 represents an absorption spectrum of the EuS—Au composite nanocrystal. Compared to (A) in FIG. 8, in (B) in FIG. 8, absorption of Au is shifted to the side of a long wavelength as shown in a direction of arrow Y. This is because an electric permittivity of EuS affects the plasmon absorption of Au. Consequently, it was confirmed that the EuS—Au composite nanocrystal was synthesized.

(Composite Thin Film)

The composite thin film related to the embodiment of the present invention is a composite thin film composed of the crystalline Eu (II) compound nanoparticle and the crystalline metal nanoparticle. A film thickness is, for example, about 5 nm to 100 μm. An average particle size of the Eu (II) compound nanoparticle is, for example, about 5 nm to 100 nm. As a material of the Eu (II) compound nanoparticle, an europium chalcogenide of, for example, EuO, EuS, EuSe or EuTe is used. An average particle size of the metal nanoparticle is, for example, about 5 nm to 100 nm. A material of the metal nanoparticle may be any metal which generates a localized electric field on its surface by light irradiation, and for example, Ag, Au, Pt, Cu or their combination is used. Alternatively, an alloy of two or more selected from Ag, Au, Pt and Cu may be used.

The composite thin film is constituted so that interfaces of the crystalline Eu (II) compound nanoparticle and the crystalline metal nanoparticle are joined. In addition, any means for joining the interfaces may be employed, for example, the Eu (II) compound nanoparticle and the metal nanoparticle may be simultaneously crystallized and deposited, and thereby joined, alternatively the thin film comprising the metal nanoparticle may be laminated onto the thin film comprising the Eu (II) compound nanoparticle, alternatively the metal nanoparticle may be doped to the thin film comprising the Eu (II) compound nanoparticle.

When the aforementioned composite thin film is irradiated with light, plasmon is generated on the surface of the metal particle to cause the electric field enhancing effect. This electric field enhancement affects magnetooptical properties of the Eu (II) compound nanoparticle combined with the metal particle. As a result, the magnetooptic effects of the Eu (II) compound nanoparticle itself can be increased. In addition, the Eu (II) compound is used as a nanoparticle, thereby the Faraday effect can be shown across a wide region from ultraviolet to infrared at room temperature due to the quantum size effect. Thus, the compound can be used as an optical element or the like corresponding to a wide range of wavelengths.

(Manufacturing Method of the Composite Thin Film)

The manufacturing method of the composite thin film related to the embodiment will be explained. Hereinafter, a case where EuS is used as an Eu (II) compound and Au is used as a metal will be explained from the viewpoint of easiness of understanding of the explanation.

First, an Eu (III) carbamide complex as a synthetic raw material of the EuS nanocrystal: [Eu(PPh$_4$)(S$_2$CNEt$_2$)] and an Au complex as a synthetic raw material of the Au nanocrystal: [Au(PPh3)Cl] are prepared. Components of the complex are identified by NMR, IR, elementary analysis or the like.

Next, the Eu (III) carbamide complex, the Au complex and a supporting electrolyte are dispersed in a solvent. As the supporting electrolyte, for example, tetraethylammonium hexafluorophosphate is used. As the solvent, for example, acetonitrile is used. In addition, the Eu (III) carbamide complex and the Au complex may be individually dispersed in different solvents.

Figure 9:
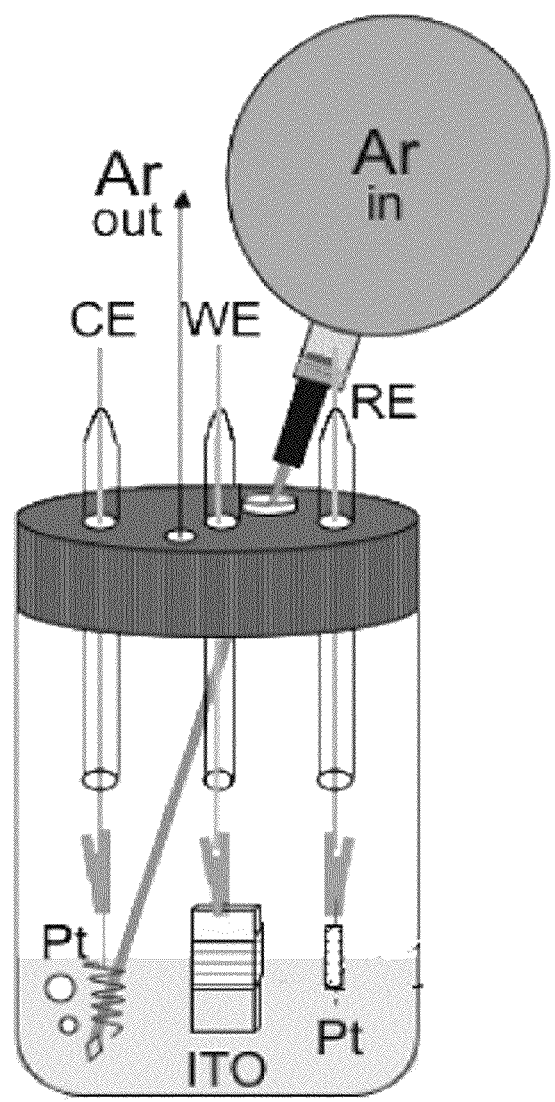
FIG. 9 represents a schematic view illustrating a manufacturing equipment of the EuS/Au composite thin film.

Next, a transparent electrode is used as a work electrode WE for electrochemical synthesis of the thin film, and the transparent electrode WE, a reference electrode RE and a counter electrode CE are inserted into the solvent, to which a voltage is applied during degasification by Ar, as shown in FIG. 9. For example, an indium tin oxide (ITO) is used as the transparent electrode, and platinum (Pt) is used for the reference electrode and the counter electrode.

When the Eu (III) carbamide complex and the Au complex are dispersed in the solvent, the transparent electrode is inserted into the solvent, to which a voltage is applied, resulting in production of a composite thin film comprising the EuS nanoparticle and the Au nanoparticle on the transparent electrode. Thus, the composite thin film can be electrochemically manufactured. In addition, when the Eu (III) carbamide complex and the Au complex are dispersed in different solvents, the transparent electrode is inserted into the solvent in which the Eu (III) carbamide complex is dispersed, to which a voltage is applied, resulting in production of an EuS thin film comprising the EuS nanoparticle on the transparent electrode. Next, the transparent electrode is inserted into the solvent in which the Au complex is dispersed, to which a voltage is applied, resulting in production of an Au thin film comprising the Au nanoparticle on the EuS thin film. Production steps of the Au thin film and the EuS thin film may be alternately carried out. Thereby, a layer structure of the EuS/Au composite thin film is produced.

Figure 10:
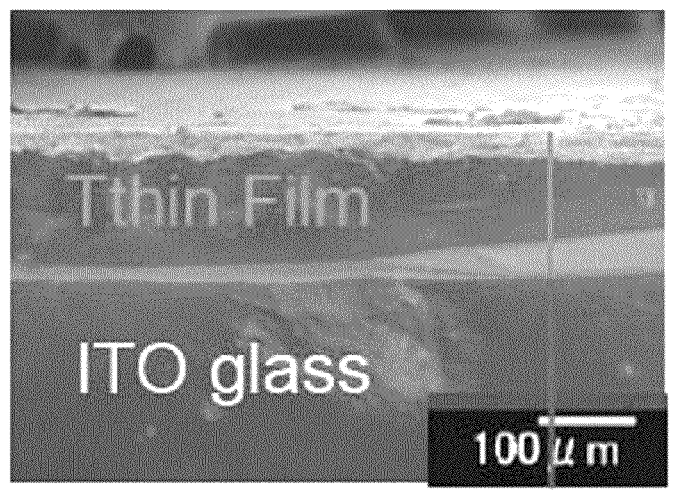
FIG. 10 represents a cross-sectional SEM image of the EuS thin film.
Figure 11:
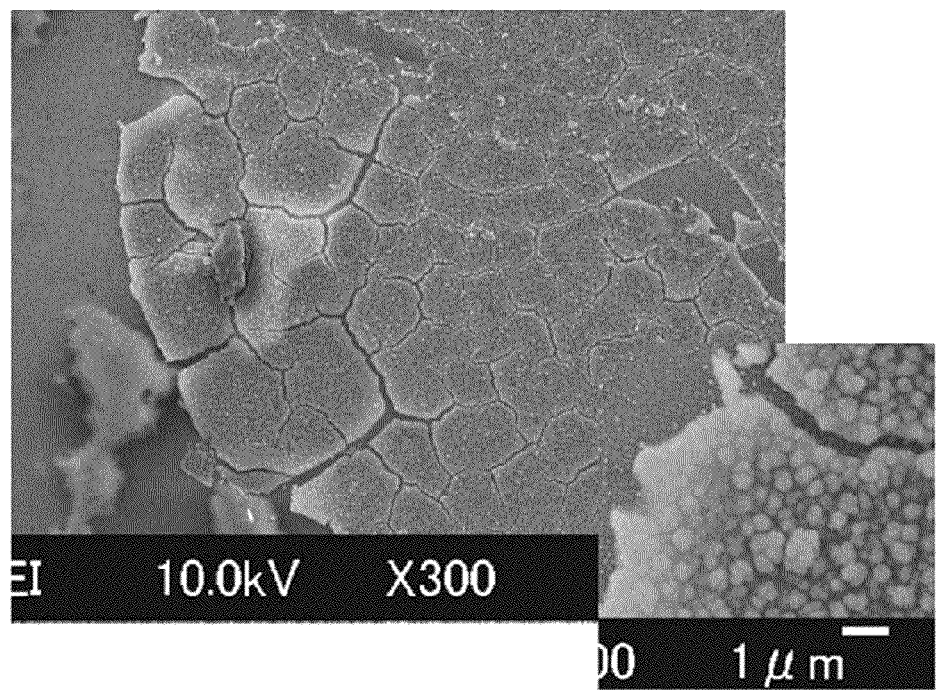
FIG. 11 represents an SEM image of the EuS thin film.

Structural evaluation of the EuS thin film obtained by the production steps of the EuS thin film by electrochemical reduction mentioned above will be shown below. FIGS. 10 and 11 are images by a scanning electron microscope (SEM). As shown in FIG. 10, a thin film of about 100 μm was confirmed to be produced on the transparent electrode. In addition, as shown in FIG. 11, the thin film was confirmed to be composed of a nanoparticle. Furthermore, elemental constituents were evaluated by an energy dispersion spectroscopy (EDS). As a result, a ratio of Eu:S was confirmed to be 1:1.

Furthermore, it was verified whether or not the EuS thin film being a sequential film and having an appropriate composition ratio can be produced by the manufacturing equipment shown in FIG. 9, Conditions for production of the EuS thin film are as follows.

Figure 12:
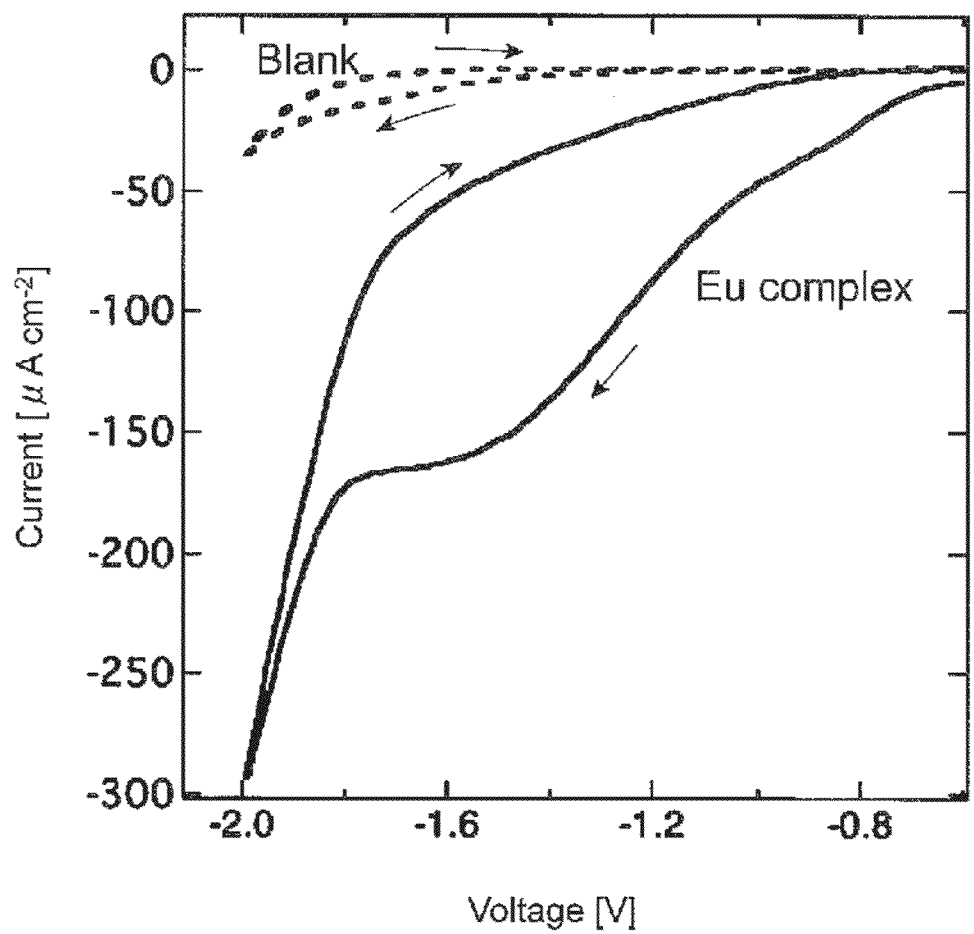
FIG. 12 represents current-voltage properties of the EuS thin film.

Solvent: acetonitrile 20 ml
Supporting electrolyte: tetraethylammonium hexafluorophosphate 0.1 mol/l
Sample: Eu (III) dithiocarbamide complex 0.06 mol/l
Degasification by Ar: 15 minutes First, the voltage applied to the reference electrode and the counter electrode was changed at 100 mV/s, and current-voltage characteristics at applied voltages ranging 0-2 V were determined, in order to verify whether Eu (III) changed into Eu (II) under the aforementioned condition. The result is shown in FIG. 12. In FIG. 12, the horizontal axis represents voltage, and the vertical axis represents current. In FIG. 12, the measurement result of the case where the solvent contains no sample is represented by a dashed line (Blank), and the measurement result of the case where the solvent contains the sample is represented by a continuous line (Eu complex). In the case where the voltage was changed from 0 V to −2.0 V, the result was represented by the lower dashed line or continuous line, and in the case where the voltage was changed from −2.0 V to 0 V, the result was represented by the upper dashed line or continuous line. Thus, it was confirmed that the more the voltage was applied to the solvent containing the Eu (III) dithiocarbamide complex, the higher the current was, that is, Eu (III) changed into Eu (II).

Figure 13:
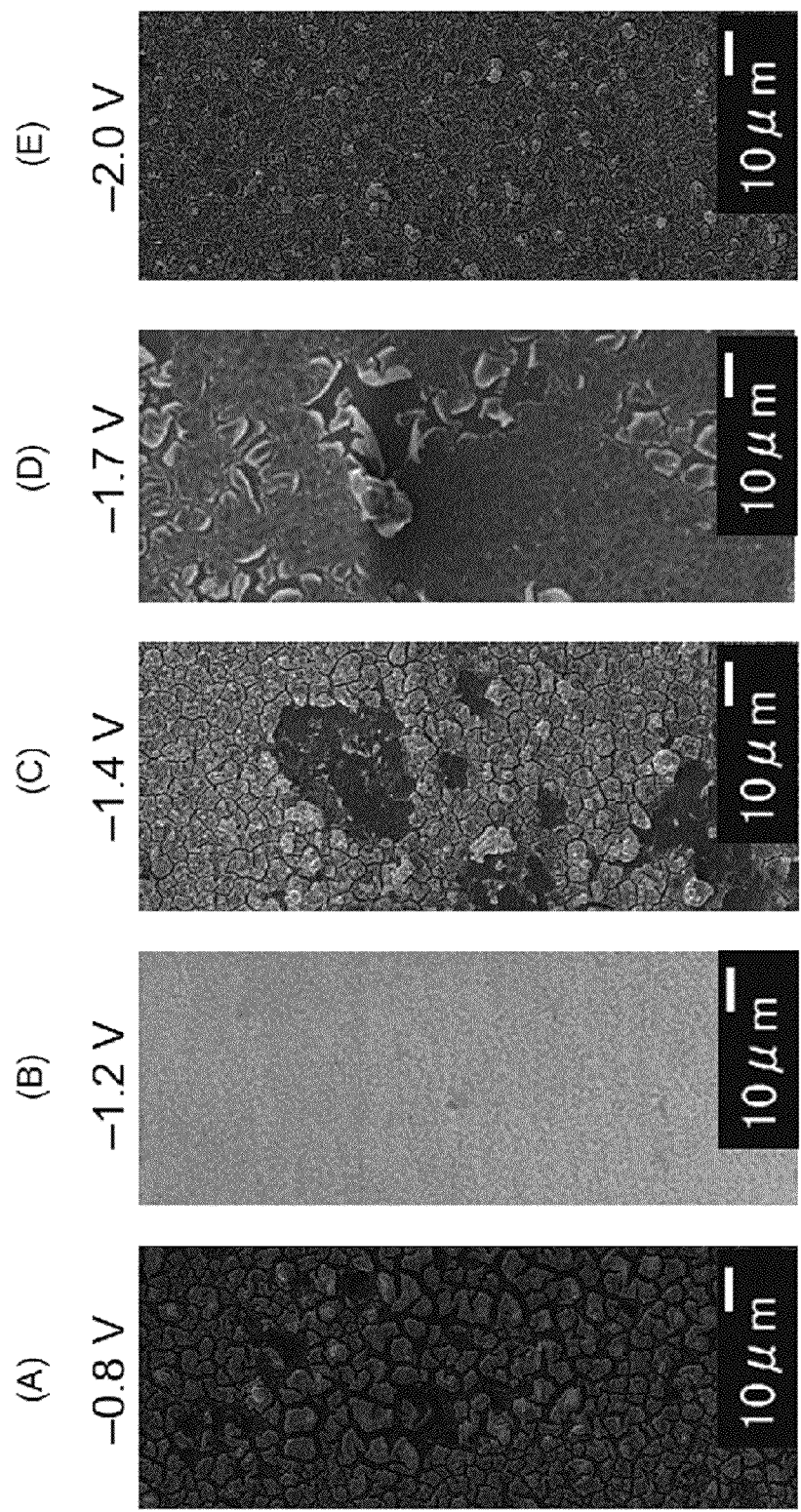
FIG. 13 represents SEM images of each EuS thin film produced under different voltages applied. (A) is at −0.8 V, (B) is at −1.2 V, (C) is at −1.4 V, (D) is at −1.7 V, and (E) is at −2.0 V.

EuS thin films of sample No. 1 to sample No. 5 were produced using the equipment shown in FIG. 9 in order to verify a constant voltage suitable for application to the reference electrode and the counter electrode. The applied voltage at the time of production of sample No. 1 was −0.8 V, the applied voltage at the time of production of sample No. 2 was −1.2 V, the applied voltage at the time of production of sample No. 3 was −1.4 V, the applied voltage at the time of production of sample No. 4 was −1.7 V, and the applied voltage at the time of production of sample No. 5 was −2.0 V. The application time of the voltage was 3 hours. Surface structures of the obtained sample No. 1 to sample No. 5 were observed. FIG. 13 represents SEM images of the EuS thin film. (A) is an SEM image of sample No. 1, (B) is an SEM image of sample No. 2, (C) is an SEM image of sample No. 3, (D) is an SEM image of sample No. 4, and (E) is an SEM image of sample No. 5. As shown in FIG. 13 (A), it was confirmed that, in the case of the applied voltage of −0.8 V, a film was not formed but an island structure was formed. This is due to insufficient growth of EuS caused by insufficient current. Meanwhile, as shown in (C) to (E) in FIG. 13, it was confirmed that, in the case of the applied voltage of −1.4 V or higher, a part of the film was stripped, resulting in a discontinuous film. This is due to the fact that EuS excessively grew in some parts due to excessive current and became a mass, and therefore was stripped. As shown in (B) in FIG. 13, when the applied voltage was −1.2 V, a continuous film was confirmed. This is due to appropriate current. Furthermore, the EuS thin film explained in FIG. 13 was evaluated for elemental constituents by EDS. Results of evaluation for ratios of Eu to S are shown in Table 1.

TABLE 1

| | Sample | | | | |
|---|---|---|---|---|---|
| | No. 1 | No. 2 | No. 3 | No. 4 | No. 5 |
| Voltage | −0.8 | −1.2 | −1.4 | −1.7 | −2.0 |
| Es/S (ratio) | 1.1 | −0.8 | 1.0 | 1.8 | 2.2 |

As shown in Table 1, a ratio of Eu and S was confirmed to be about 1:1 within a range of the applied voltages of 0.8 V to 1.4 V. Thus, it was confirmed that when the applied voltage was −1.2 V, preferable EuS thin film grew.

Figure 14:
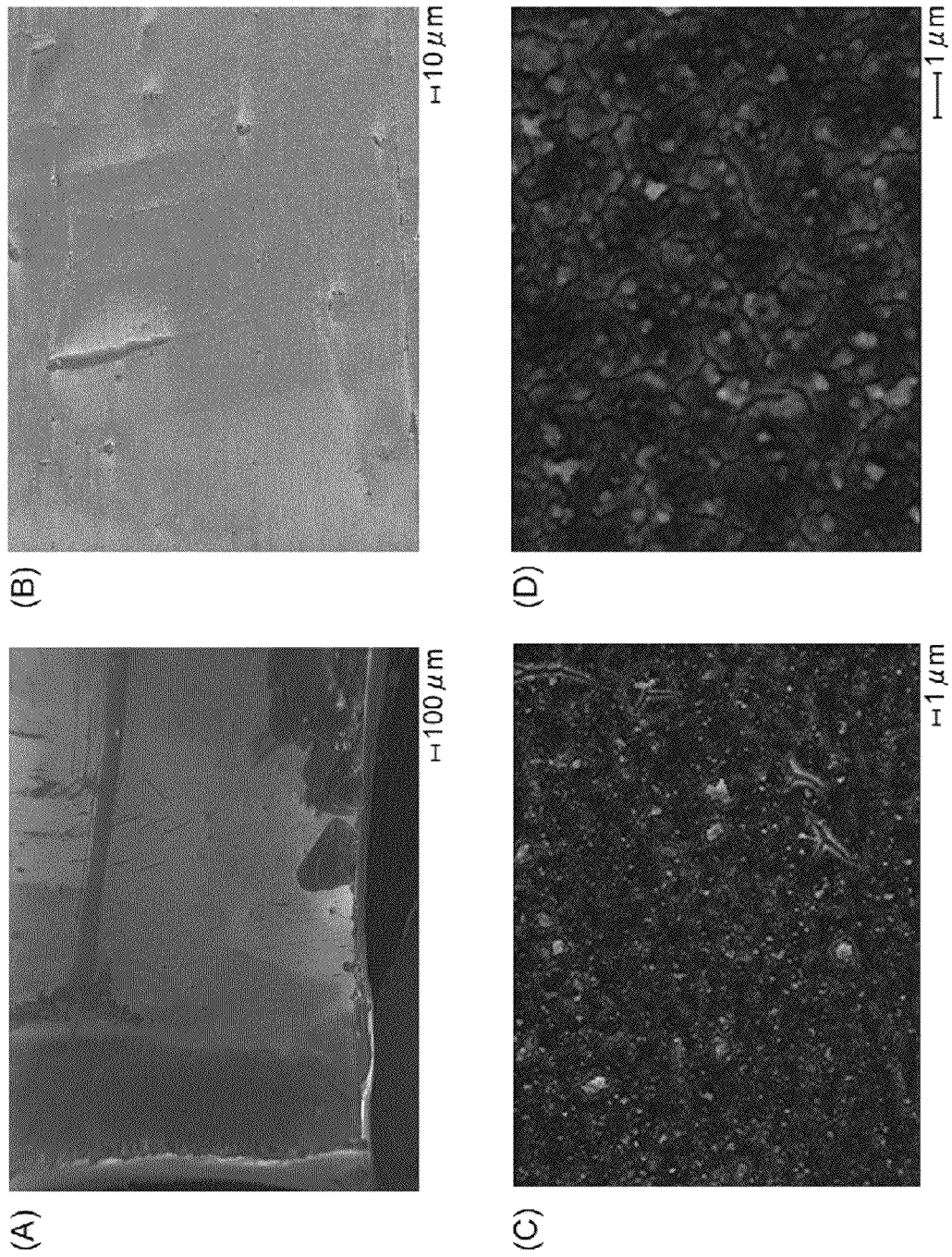
FIG. 14 represents SEM images of the EuS thin film (applied voltage is −1.2 V). (A) to (D) represent results of observations at different scales respectively.
Figure 15:
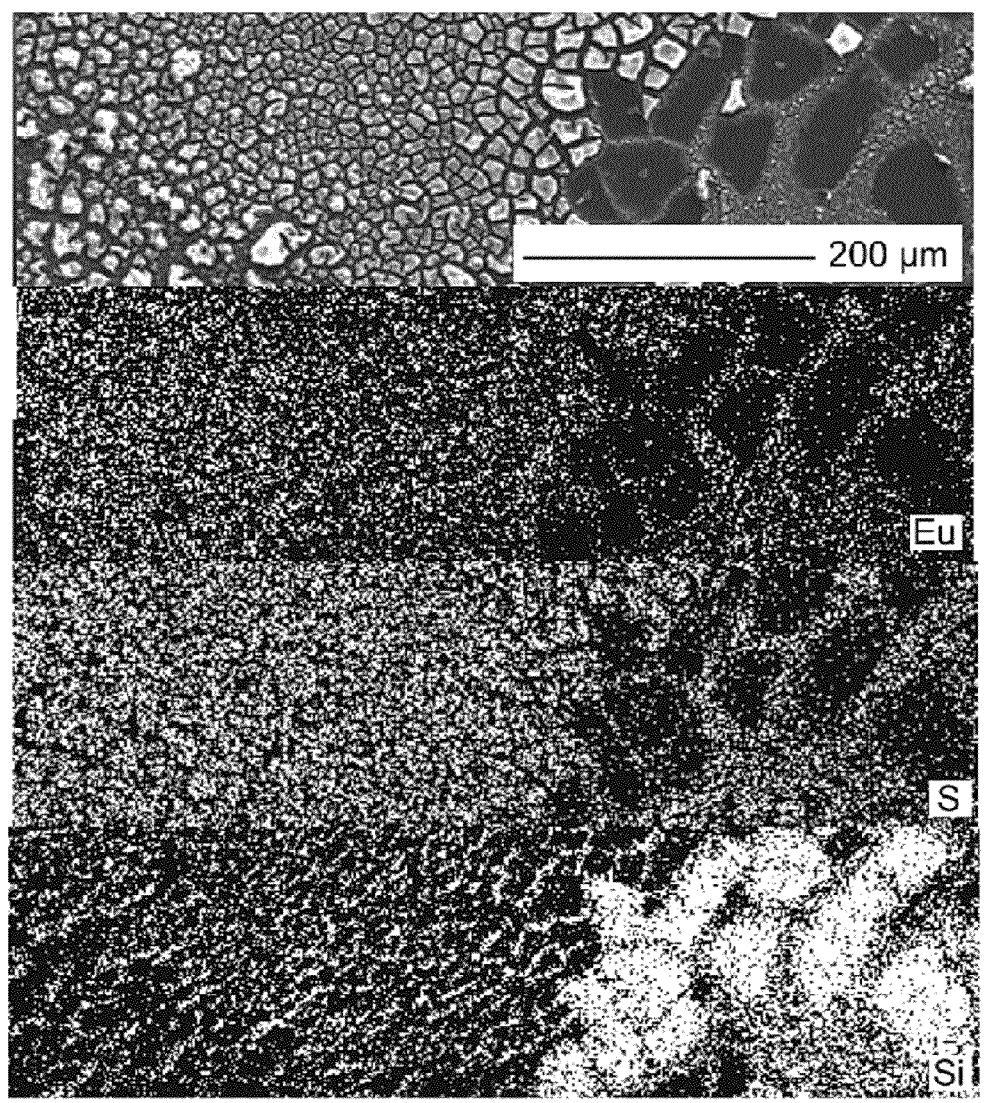
FIG. 15 represents results of EDS mappings of the EuS thin film (applied voltage is −1.2 V). (A) represents an SEM image, (B) represents a result of mapping of Eu, (C) represents a result of mapping of S, and (D) represents a result of mapping of Si.

Detailed evaluation results of sample No. 2 mentioned above will be explained. FIG. 14 represents SEM images of the EuS thin film of sample No. 2. The scales of the SEM images (A), (B), (C) and (D) are in ascending order, and observation in μm unit was conducted in detail. As shown in FIG. 14, when the applied voltage was −1.2 V, production of a thin film was confirmed. Next, components of sample No. 2 were measured. In sample No. 2, an area where a part of the continuous film was stripped was found to measure it, and additionally a glass substrate coated with ITO was measured. The results are shown in FIG. 15. FIG. 15 represents results of EDS mapping of sample No. 2. (A) represents an SEM image, (B) represents a result of mapping of Eu, (C) represents a result of mapping of S, and (D) represents a result of mapping of Si. In (B) and (C), white blanks represent areas detected as elements. As shown in FIG. 15, it was confirmed that the ratio of Eu and S was 1:1 in areas other than Si, that is, areas where films were produced.

Figure 16:
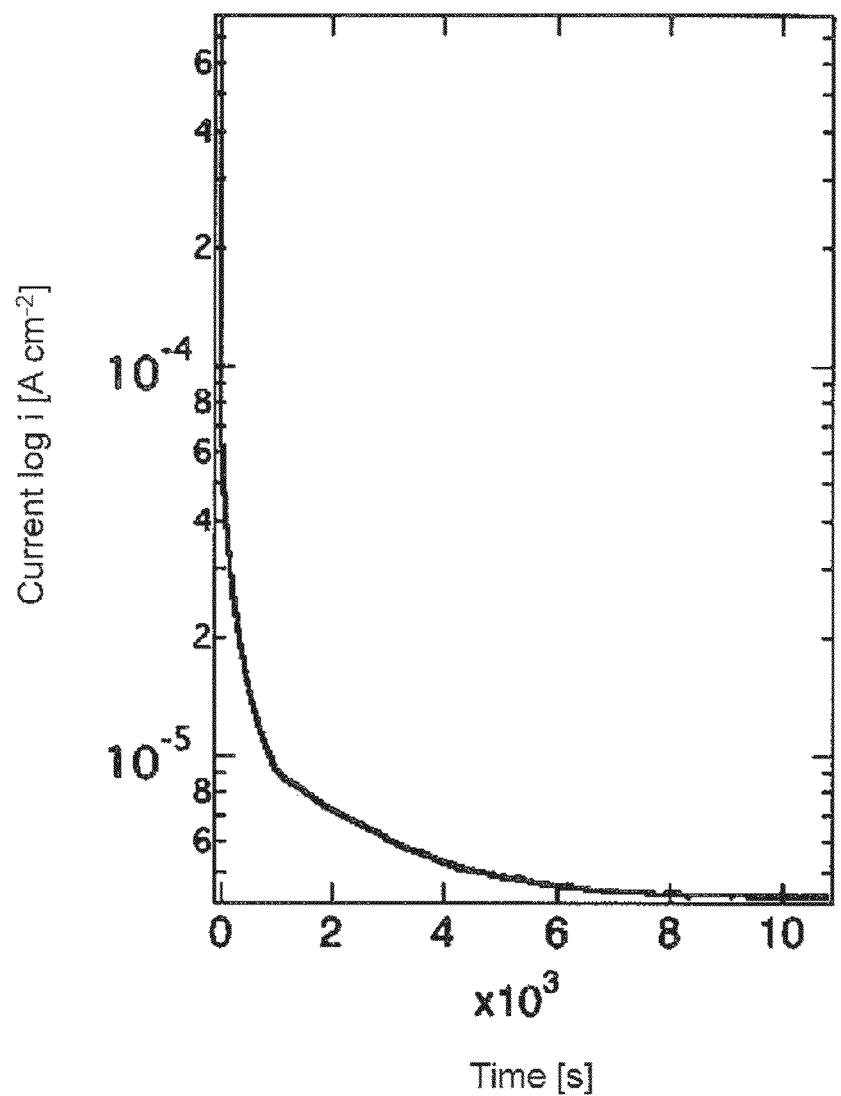
FIG. 16 represents a time change in a current value of the EuS thin film (applied voltage is −1.2 V).

FIG. 16 represents a time change in a current value at the time of production of sample No. 2. The horizontal axis represents time, and the vertical axis represents the current value. As shown in FIG. 16, the current value became constant by applying a constant voltage (−1.2 V) for a long time in electrochemical synthesis. For example, after $4 \times 10^3$ [s], the current value became nearly constant. The fact that the current value becomes constant means steady reaction, that is, the fact that the same reactions constantly occur at the same speed. In other words, it was confirmed that, first, EuS accumulated on the surface of ITO, and the film thickness grew with time, then only reaction for accumulating EuS on EuS constantly occurred at the same speed.

Figure 17:
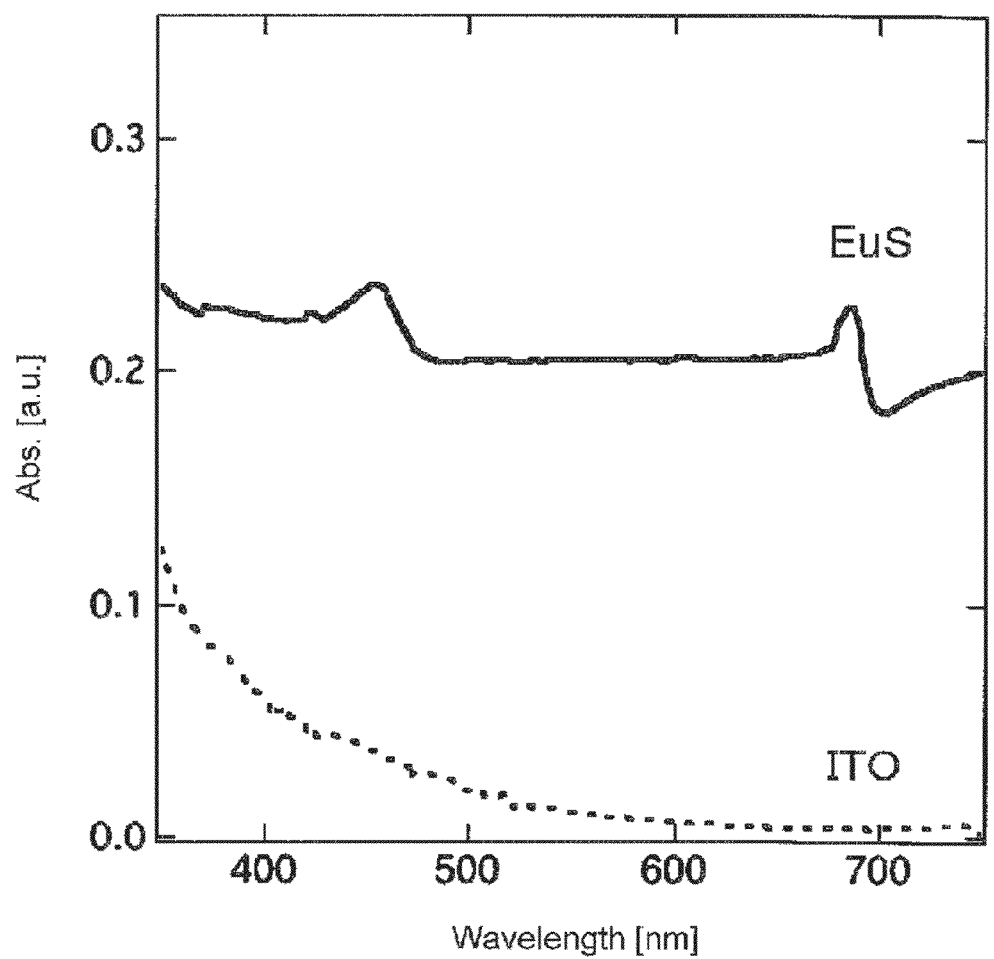
FIG. 17 represents measured results of photoabsorption spectra in example and comparative example.

FIG. 17 represents measured results of photoabsorption spectra of sample No. 2 deposited on ITO on the glass substrate and the glass substrate coated with ITO. The horizontal axis represents wavelength, and the vertical axis represents intensity. In FIG. 17, the photoabsorption spectrum of the glass substrate coated with ITO is represented by a dashed line, and photoabsorption spectrum of sample No. 2 is represented by a continuous line. As shown in FIG. 17, absorption of light was confirmed. That is, presence of Eu (II) was confirmed.

From the aforementioned measurement results, it was confirmed that when the applied voltage was −1.2 V, the EuS thin film being a continuous thin film and having an Eu:S composition ratio of 1:1 was produced.

(Magnetooptical Material)

Figure 18:
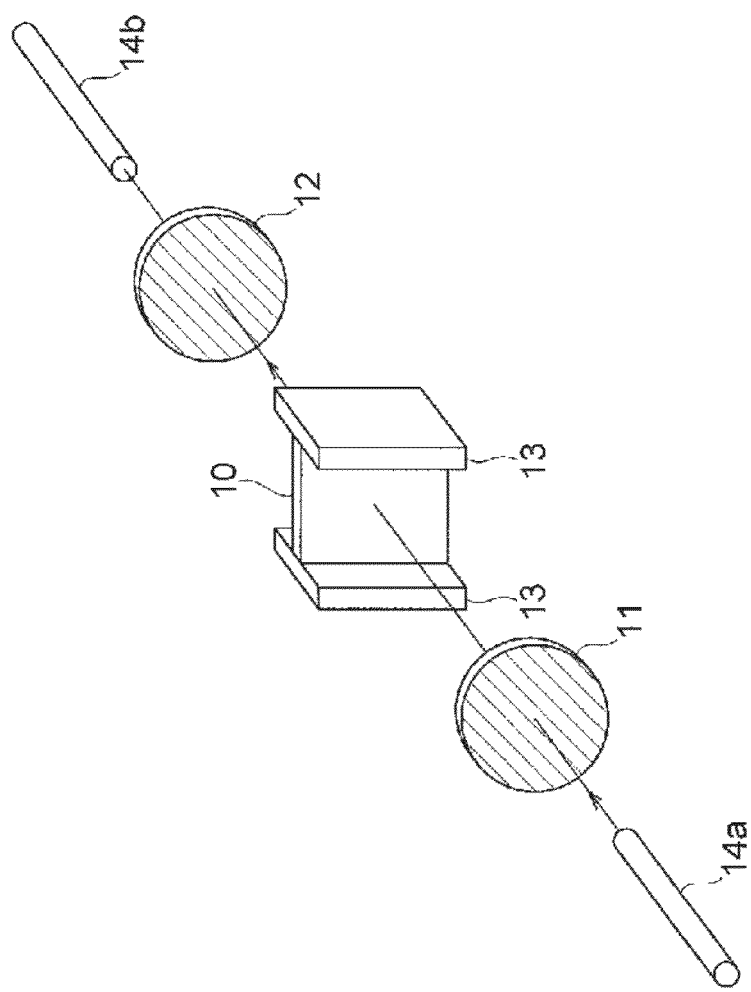
FIG. 18 represents a schematic configuration of a conventional optical isolator.

Since the aforementioned composite nanocrystal and composite thin film containing the Eu (II) compound generate great Faraday effects, they can be utilized as magnetooptical materials. For example, they may be applied to optical isolators or the like used for optical communication or the like to prevent optical feedback. FIG. 18 represents a schematic configuration of a conventional optical isolator. As shown in FIG. 18, in the structure of the optical isolator, a Faraday rotator 10 is placed between a polarizer 11 and an analyzer 12, and the Faraday rotator 10 is sandwiched between permanent magnets 13 applying a magnetic field. In the optical isolator, forward light introduced from an optical fiber 14a is linearly-polarized by a polarizer 11, then light with a polarization plane rotated by the Faraday rotator 10 is introduced to an optical fiber 14b through the analyzer 12. Meanwhile, backward light (optical feedback) is linearly-polarized by the analyzer 12, and its polarization plane is rotated by the Faraday rotator 10, but the polarization plane of light after rotation is in discord with the polarizer 11, thus light cannot pass through the polarizer 11, and the optical feedback is blocked there. As the Faraday rotator 10, one made from garnet crystal or the like has been conventionally used. Even when the Faraday rotator 10 is produced by using the composite nanocrystal or the composite thin film containing the Eu (II) compound, the same polarization rotation effect as the garnet crystal Faraday rotator 10 can be obtained. Hence, a household optical isolator for short-haul communication can be produced at a low price.

Although optical isolators now on the market correspond to only the near infrared region, the optical isolator equipped with the Faraday rotator 10 produced by using the aforementioned composite nanocrystal or composite thin film containing the Eu (II) compound corresponds to ultraviolet region as well as the visible region, and can also be used if multiwavelength communication is realized in the near future.

In addition, the aforementioned composite nanocrystal or composite thin film containing the Eu (II) compound can be utilized for optical switch based on magnetooptic effects. For example, it can be adopted as a Faraday rotator of an optical switch.

Furthermore, since the composite nanocrystal and the composite thin film containing the Eu (II) compound change in magnetic susceptibilities by light irradiation, they are expected to be applied to a device controllable with light. For example, in the constitution of FIG. 18, the composite nanocrystal and the composite thin film containing the Eu (II) compound are adopted for the Faraday rotator 10, and a light source such as a laser light source which can irradiate the Faraday rotator 10 is prepared, thereby the following two applications can be given. First, a procedure in which when the Faraday rotation rate through a permanent magnet is below a desirable rotation rate, control is conducted by irradiating the Faraday rotator 10 with light so as to make up for decreased rotation, is given. Use of this procedure can realize an optical isolator with a desirable light wavelength by light irradiation in the constitution of the optical isolator with magnet. Second, for example the optical isolator with magnet in FIG. 18 is constituted so that lights with two wavelengths are output from the optical fiber 14a, and when light is not irradiated, the optical isolator with magnet is switched to an A-wavelength optical isolator, and when light is irradiated, the optical isolator with magnet is switched to a B-wavelength (for example. A+α) optical isolator. Use of this procedure can realize an optical isolator with two light wavelengths by light irradiation in the constitution of the optical isolator with magnet.

Figure 19:
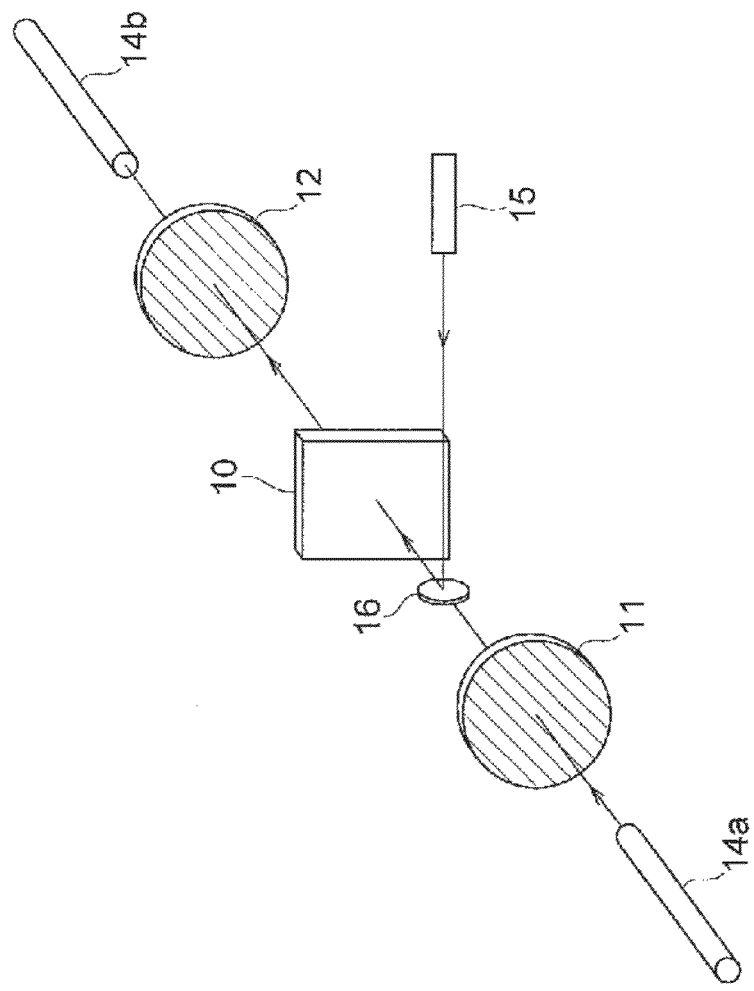
FIG. 19 represents a schematic configuration of an optical isolator having a constitution that a polarization plane of a Faraday rotator is rotated by a laser light.

Furthermore, an optical isolator which allows the polarization plane to rotate in response to light without the permanent magnet in FIG. 18 can be made. One example of such an optical isolator is shown in FIG. 19. This photoresponsive isolator has almost the same structure as the conventional optical isolators, but has the following differences. That is, it has a laser light source 15 instead of a permanent magnet, and laser light emitted from a laser light source 15 enters into the Faraday rotator 10 by a dielectric mirror 16, thereby the magnetic susceptibility of the Faraday rotator 10 is changed, so that the polarization plane is changed.

(Inorganic Glass Thin Film, Polymeric Thin Film)

In addition, a thin film having a novel property can be produced by adding the aforementioned composite nanocrystal containing the Eu (II) compound to an inorganic glass thin film and a polymeric thin film. For example, a solution containing the composite nanocrystal is rendered a colloidal solution by hydrolysis and condensation polymerization, furthermore enhanced reaction produces a gel without fluidity, and this gel is heat-treated to produce an inorganic glass thin film containing the composite nanocrystal. In addition, the polymeric thin film containing the composite nanocrystal can be produced, for example by dispersing the composite nanocrystal in a dissolved polymer, spraying it to a plate or the like and drying.

The aforementioned inorganic glass thin film and polymeric thin film may be utilized for various applications. For example, Kerr effect of the Eu (II) compound which rotates a polarization direction of a reflected light is utilized to produce a recording medium such as a magnetic optical disc writable and readable for data by using the composite nanocrystal containing the Eu (II) compound. For example, in the magnetic optical disc, while a magnetic field of which the strength does not so much as reverse the magnetization direction is applied on a recording surface made from a resin thin film containing the composite nanocrystal on the disc surface in an opposite direction of the magnetization direction, a temperature is raised by illuminating condensed laser light, so that the magnetization direction is reversed only in a part irradiated with the laser light, and data is written. In data reproduction, laser light weaker than the writing light is applied on the recording surface to detect difference in Kerr rotation angle of the reflected light by polar Kerr effects. That is, recorded signals can be read by detecting the difference in Kerr rotation angle as change in light intensity using a polarizer.

Consequently, it is possible to reduce optical transmission loss in a waveband, to optionally increase a coefficient of Faraday rotation, as well as to optionally design a plasmon-enhanced wavelength. Thereby, an optical device which cannot be realized under the conventional technology can be provided, for example, an optical isolator for two wavelengths can be composed of one optical isolator.

EXAMPLES

Example

An acrylic resin (PMMA: Poly(methyl methacrylate)) was dissolved in chloroform, and an EuS—Au composite nanocrystal was dispersed in the PMMA-containing solution. Subsequently, a thin film was produced by a casting method. The film thickness was 1 μm.

Comparative Example

An acrylic resin (PMMA) is dissolved in chloroform, and an EuS nanocrystal was dispersed in the PMMA-containing solution. Subsequently, a thin film was produced by a casting method. The film thickness was 1 μm.

(Evaluation of the Magnetooptical Property)

Figure 20:
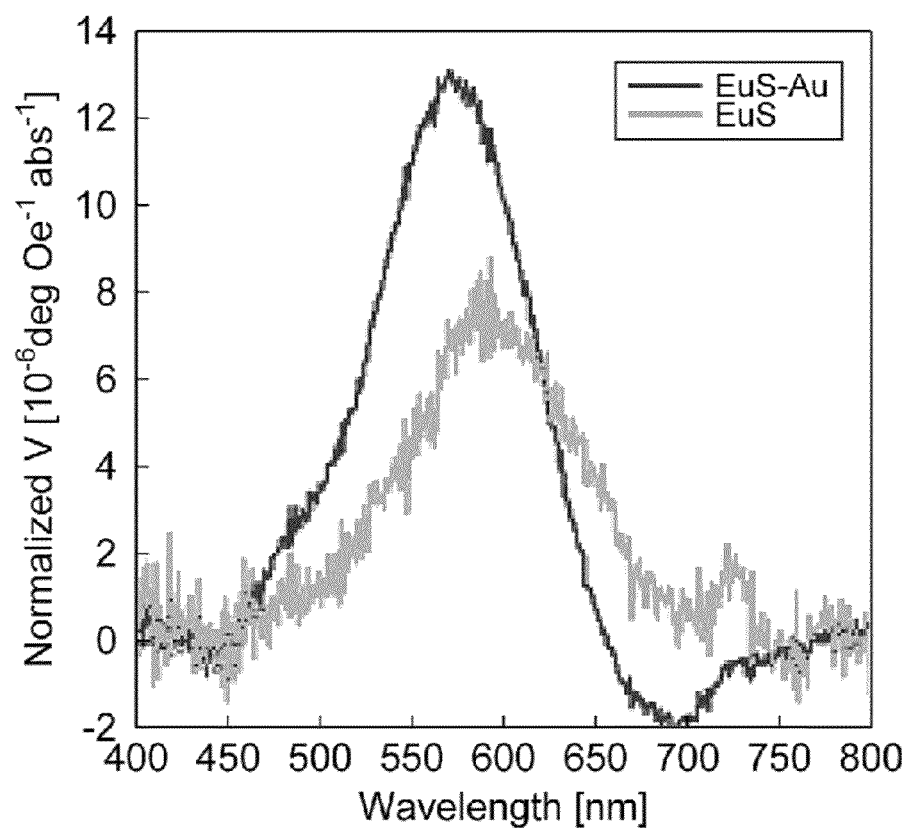
FIG. 20 represents Verdet constant spectrographies of a PMMA film containing the EuS crystal and a PMMA film containing the composite nanocrystal.

In example and comparative example, Verdet constant spectra were measured at room temperature. The measured results are shown in FIG. 20. In FIG. 20, the horizontal axis represents wavelength, and the vertical axis represents a standardized Verdet constant [$degOe^{-1}abs^{-1}$]. Here, a rotation angle of a polarization plane is standardized by an applied magnetic field and an absorbency. As shown in FIG. 20, a great change of the Faraday rotation could be found at a wavelength region of the Au plasmon absorption band. That is, the Au plasmon was confirmed to affect the magnetooptical property of EuS. In addition, the thin film of example was confirmed to generate two times Faraday effects as compared to that of the thin film of comparative example.

REFERENCE SIGNS LIST

10 . . . Faraday rotator, 11 . . . Polarizer, 12 . . . Analyzer, 13 . . . Permanent magnet, 14 . . . Optical fiber, 15 . . . Laser light source, 16 . . . Dielectric mirror

The invention claimed is:

1. A composite nanocrystal which is produced by a composite with an Eu (II) compound nanoparticle and a metal nanoparticle, wherein the Eu (II) compound nanoparticle and the metal nanoparticle each have a crystalline structure, and the Eu (II) compound nanoparticle is combined with the metal nanoparticle through a compound having the same or different two or more of a thiol group, a hydroxyl group, a carboxyl group, a sulfonic group, a cyano group, an amino group or a pyridyl group.

2. The composite nanocrystal according to claim 1, wherein the Eu (II) compound nanoparticle is made of a material selected from EuO, EuS, EuSe or EuTe.

3. The composite nanocrystal according to claim 2, wherein the metal nanoparticle is made of a metal material selected from Ag, Au, Pt and Cu, a combination of the metal materials, or an alloy of two or more selected from Ag, Au, Pt and Cu.

4. The composite nanocrystal according to claim 1, wherein the metal nanoparticle is made of a metal material selected from Ag, Au, Pt and Cu, a combination of the metal materials, or an alloy of two or more selected from Ag, Au, Pt and Cu.

5. A magnetooptical material which is produced by using the composite nanocrystal described in claim 1.

6. An inorganic glass thin film which comprises the composite nanocrystal described in claim 1.

7. An optical isolator equipped with a Faraday rotator, which is produced by using the inorganic glass thin film described in claim 6.

8. A polymeric thin film which comprises the composite nanocrystal described in claim 1.

9. An optical isolator equipped with a Faraday rotator, which is produced by using the composite nanocrystal described in claim 1.

10. A manufacturing method of composite nanocrystal described in claim 1, which comprises:
    a step of mixing a complex containing Eu (III) with a complex containing a metal, and
    a step of synthesizing the composite nanocrystal by thermal reduction of the mixed complex.

11. A composite thin film which is produced by a composite with an Eu (II) compound nanoparticle and a metal nanoparticle, wherein the Eu (II) compound nanoparticle is made of a material selected from EuS or EuSe, and the metal nanoparticle is made of a metal material selected from Ag, Au, Pt and Cu, a combination of the metal materials, or an alloy of two or more selected from Ag, Au, Pt and Cu.

12. The composite thin film according to claim 11, which is constituted so that interfaces of the Eu (II) compound nanoparticle and the metal nanoparticle are joined, wherein the Eu (II) compound nanoparticle and the metal nanoparticle each have a crystalline structure.

13. An optical isolator equipped with a Faraday rotator, which is produced by using the magnetooptical material described in claim 12.

14. The composite thin film according to claim 11, which has a layer structure in which a thin film comprising the Eu (II) compound nanoparticle and a thin film comprising the metal nanoparticle are alternately laminated, wherein the Eu (II) compound nanoparticle and the metal nanoparticle each have a crystalline structure.

15. An optical isolator equipped with a Faraday rotator, which is produced by using the magnetooptical material described in claim 14.

16. A magnetooptical material which is produced by using the composite thin film described in claim 11.

17. An optical isolator equipped with a Faraday rotator, which is produced by using the composite thin film described in claim 11.

18. A manufacturing method for electrochemically manufacturing a composite thin film described in claim 11, which comprises:
    a step of dispersing a complex containing Eu (III) and a complex containing a metal in a solvent, and
    a step of applying a voltage by inserting a transparent electrode as a work electrode into the solvent to produce the composite thin film composed of an Eu (II) compound nanoparticle and a metal nanoparticle on the transparent electrode.

19. A manufacturing method for electrochemically manufacturing a composite thin film described in claim 11, which comprises:
    an Eu-dispersing step of dispersing a complex containing Eu (III) in a solvent,
    a metal-dispersing step of dispersing a complex containing a metal in the solvent,
    and a thin film-producing step of applying a voltage by inserting a transparent electrode as a work electrode into the solvent to produce a thin film composed of an Eu (II) compound or a metal on the transparent electrode,
    wherein the Eu-dispersing step, the thin film-producing step, the metal-dispersing step and the thin film-producing step are carried out in turn, alternatively the metal-dispersing step, the thin film-producing step, the Eu-dispersing step and the thin film-producing step are carried out in turn.

20. A manufacturing method of composite nanocrystal, which comprises:
    a step of synthesizing a crystalline Eu (II) compound nanoparticle by thermal reduction of a complex containing Eu (III),
    a step of synthesizing a crystalline metal nanoparticle by thermal reduction of a complex containing a metal, and
    a step of synthesizing the composite nanocrystal by combining the Eu (II) compound nanoparticle with the metal nanoparticle through a compound having the same or different two or more of a thiol group, a hydroxyl group, a carboxyl group, a sulfonic group, a cyano group, an amino group or a pyridyl group.

* * * * *